UNITED STATES PATENT OFFICE.

EDOUARD HUNEBELLE, OF PARIS, FRANCE.

PROCESS FOR THE PRODUCTION OF ZINC OXID.

1,201,586.            Specification of Letters Patent.    Patented Oct. 17, 1916.

No Drawing.        Application filed May 23, 1914. Serial No. 840,466.

*To all whom it may concern:*

Be it known that I, EDOUARD HUNEBELLE, citizen of the French Republic, residing at Paris, Department of the Seine, in France, have invented certain new and useful Improvements in Processes for the Production of Zinc Oxid; and I do hereby declare the following to be a full, clear, and exact description of the invention, such as will enable others skilled in the art to which it appertains to make and use the same.

This invention has for its object a new or improved process for the conversion into pure oxid of zinc of impure oxids or carbonates of zinc, of cadmia (from iron furnaces) of zinc vapors and of the principal zinkiferous residues from chemical works or factories, by means of magnesia or of carbonate of magnesia as well as the subsequent recuperation of the latter chemical. The cycle of operation is a closed cycle and merely includes small losses due to the working of the process.

In carrying my invention into practical effect, the material used such as impure oxid of zinc, cadmia from iron works, zinc vapors, zinc residuum from chemical works, etc., is treated by slightly chlorinated hydrochloric acid. When the action is over, a suitable proportion of sulfate of magnesia is added to the liquor which precipitates as sulfate of lead all traces of chlorid of lead which may have remained in the solution. Carbonate of calcium is subsequently added thereto.

Owing to the action of the chlorinated hydrochloric acid on the material aforesaid, metals and particularly iron are highly oxidized so that the precipitation by carbonate of calcium of substances capable of being precipitated is complete, and all there is left in the solution is zinc chlorid.

If the substance treated contains neither iron nor metals capable of being precipitated by carbonate of calcium, a small quantity of iron is added thereto the action of which is merely physical and consists in carrying away after precipitation by the carbonate and in coating the fine and tenuous precipitate the wholesale filtration of which would be difficult and incomplete.

After filtration, there is obtained an insoluble residuum containing the precipitated metals on the one hand and a solution of pure chlorid of zinc on the other hand. The residuum is then treated separately in order to recuperate the metals therein contained. The solution of chlorid of zinc is subjected to the action of carbonate of magnesia or of magnesia alone.

There is formed soluble chlorid of magnesium and insoluble carbonate or oxid of zinc. After filtration and washing pure carbonate or oxid of zinc is obtained. In order to recover the carbonate or oxid of magnesium, I proceed as follows: The zinc having been thoroughly precipitated either by the aid of heat or without, solutions of chlorid of magnesium are obtained and do not register much more than 30° B. at an ordinary temperature. These solutions are concentrated by the lost heat derived from the furnaces or ovens so as to obtain the following salt: $MgCl_2 + 6Aq$. This salt is introduced into a suitable oven and gradually heated. At a temperature of 165°, this salt is decomposed into HCl and MgO and this decomposition progresses up to 250°. From this moment steam is injected into the mixture which contains a strong proportion of oxychlorid or the said mixture may be otherwise hydrated. The temperature is gradually raised to from 550 to 600°. There is then evolved under the action of air and steam which however must be suitably regulated a mixture of chlorin and hydrochloric acid which are condensed together in suitable condensing apparatus. The whole of the acid collected which may be called "chlorinated hydrochloric acid" will serve for a fresh treatment of zinkiferous material. The residuum from this calcination of chlorid of magnesium is pure magnesia which may be readily converted into carbonate and will serve for the precipitation of zinc as hereinbefore stated. In short it will be seen that this process forms a complete cycle without any loss of chemicals except incidental losses in the working.

I claim:

1. The method of obtaining pure zinc compounds from zinkiferous materials which consists in treating the zinkiferous material wth hydrochloric acid, and then adding calcium carbonate to precipitate impurities and to leave substantially pure zinc chlorid.

2. The method of obtaining pure zinc compounds from zinkiferous materials, which consists in treating the zinkiferous material with hydrochloric acid, and then adding magnesium sulfate and calcium carbonate to precipitate impurities and leave substantially pure zinc chlorid.

In testimony whereof I affix my signature, in presence of two witnesses.

EDOUARD HUNEBELLE.

Witnesses:
    CHAS. P. PRESSLY,
    LOUIS FOSSE.